Nov. 12, 1968
J. J. SCOTT ET AL
3,410,666
ELECTRIC FUSION CRYSTALLIZATION OF
MAGNESIUM, ZIRCONIUM AND
CALCIUM OXIDES
Original Filed Oct. 11, 1962
2 Sheets-Sheet 1
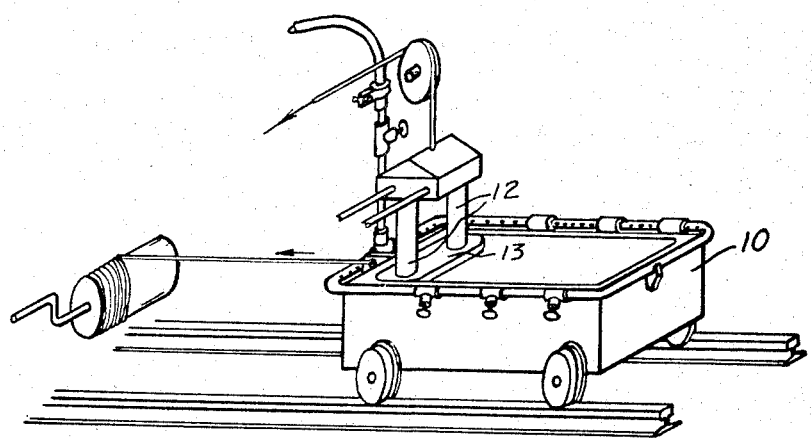
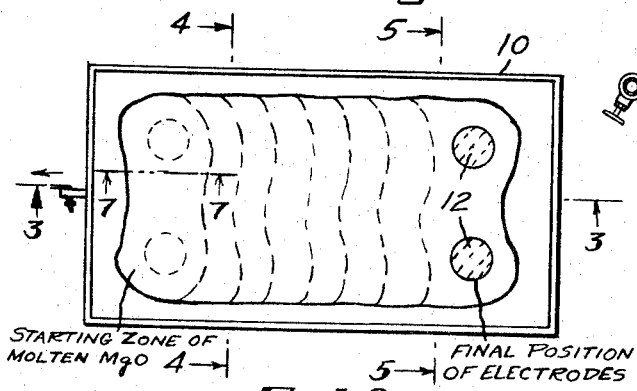
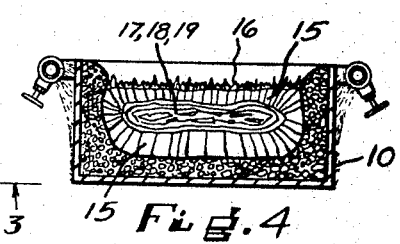
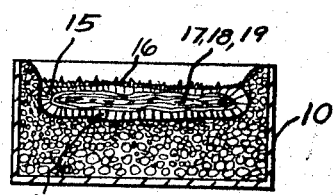
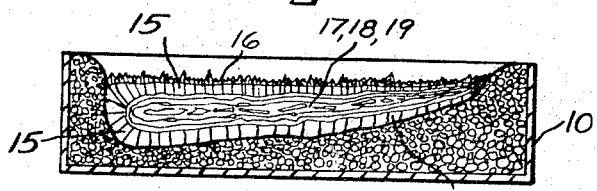
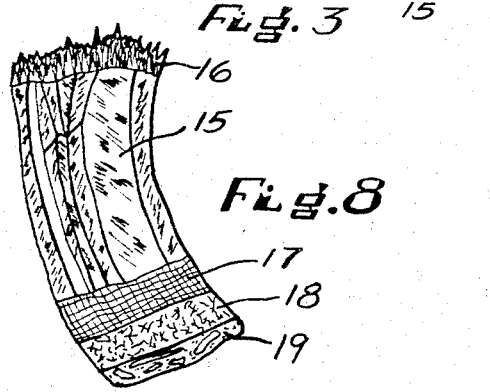
INVENTORS.
JOHN J. SCOTT
NEIL C. TURNBULL
BY
Allan R. Redrow
ATTORNEY United States Patent Office
3,410,666
Patented Nov. 12, 1968

3,410,666
ELECTRIC FUSION CRYSTALLIZATION OF MAGNESIUM, ZIRCONIUM AND CALCIUM OXIDES
John J. Scott and Neil C. Turnbull, Chippawa, Ontario, Canada, assignors to Norton Company, Worcester, Mass., a corporation of Massachusetts
Original application Oct. 11, 1962, Ser. No. 229,851. Divided and this application Aug. 6, 1965, Ser. No. 485,969
6 Claims. (Cl. 23—304)

ABSTRACT OF THE DISCLOSURE

Process for producing large crystals of refractory material by providing an elongated bed of fusible magnesium oxide, zirconium oxide or lime, progressively melting or fusing the refractory material by shifting a pair of graphite electrodes from one end of the bed to the other and permiting that increment of the molten refractory material, immediately at one side of the electrodes, to solidify while in a substantially quiescent condition.

---

This application is a division of copending application, Ser. No. 229,851, filed Oct. 11, 1962.

This invention relates to the production of large crystals of refractory material and more especially to the production of large individual crystals and polycrystalline plates of nearly pure magnesium oxide.

The principal objects of the invention are to provide a method for producing large, single magnesium oxide crystals and/or large polycrystalline plates of magnesium oxide with the axes of the several crystals oriented in such a manner as to give the appearance and effect, when polished, as if the plates were a single crystal.

Other objects are to provide a method of fusing crystallizable material in a manner to enhance crystal growth and to obtain crystals from raw materials containing varying percentages of impurities by an arc furnace melting process.

Other objects are to provide a method of producing crystals containing small percentages of added elements or compounds; to provide a method for producing crystals in variable quantities as desired; to provide a method which may be applied to any crystallizable material which can be melted in an arc furnace; and to provide a method which is efficient.

Still other objects are to provide an electric arc furnace which is simple in construction; which may be constructed of materials adapted to contain the high temperatures employed; and which is geometrically designed to provide for a controlled cooling.

As herein illustrated, the method comprises subjecting a horizontally elongated bed of granular crystallizable refractory material to an arc furnace system for fusing a zone thereof adjacent one end of the bed and then supplying additional heat while progressively and continuously effecting a relative shifting or movement of arc means for producing the molten zone, lengthwise of the bed while slowly cooling that material which was previously rendered molten. The progressive movement of the zone of molten material from end to end of the bed is accomplished by using the relatively moving arc means for rendering fluid, the successive increments of the material in the bed on one side of the molten zone. Simultaneously the molten material on the other side of the molten zone is allowed to cool and solidify.

In the preferred form of the invention, initially, a localized zone of magnesium oxide, for example, is liquefied by lowering a pair of electrodes into engagement with the prepared bed of granular or powdered magnesia containing material and holding the bed stationary until liquefaction of a localized zone in contact with the electrodes is obtained. Once the molten zone has been established, the container for the bed of the material is moved slowly relative to the electrodes to progressively melt the solid material forming the bed as it moves toward the electrodes. Simultaneously the liquid at the opposite side of the molten zone is moving away from the electrodes and is supported in a manner to remain substantially quiescent while it cools and begins to crystallize.

The material forming the bed is supported in a relatively shallow layer within a flat container and has a large exposed area. Melting is effected so as to maintain the molten zone supported within a layer of additional material from which the bed is formed, this unmelted granular material being disposed beneath and on the vertical sides of the bed throughout the process.

The fusing method is carried out by supporting a quantity of material for movement relative to a pair of electrodes in a car adapted to hold the material in a relatively shallow layer having a broad, flat surface exposed to the electrodes. The car is preferably comprised of metal and graphite electrodes are employed. Any suitable mechanism may be used to draw the car very slowly forwardly relative to the electrodes. The flow of current to produce the initial melting, is initiated by placing the usual carbon bridge on the material at the beginning of the operation at about 18 inches from the end of the bed and the electrodes are ultimately withdrawn from the bed after the car has been pulled along under the electrodes until they are located about 18 inches inwardly from the opposite end of the car.

The invention will now be described in greater detail with reference to the preferred form shown in the accompanying drawings wherein:

FIG. 1 is a perspective view of a car loaded with crushed magnesite showing a carbon bridge at one end and a pair of electrodes lowered into engagement with the bridge preparatory to initiating the operation;

FIG. 2 is a plan view of the approximate shape of the zone of the molten magnesia formed by the electrodes;

FIG. 3 is a longitudinal section taken on the line 3—3 of FIG. 2 showing the resulting shape of the pig produced by melting and fusing the center portion of the magnesia bed;

FIG. 4 is a transverse section taken on the line 4—4 of FIG. 2 showing the layers of crystals that result from solidification of the molten material after the bed has been passed lengthwise under the electrodes;

FIG. 5 is a transverse section taken on the line 5—5 of FIG. 2 showing crystalline formation in this region after the electrodes pass through and the material has solidified;

Figure 7:
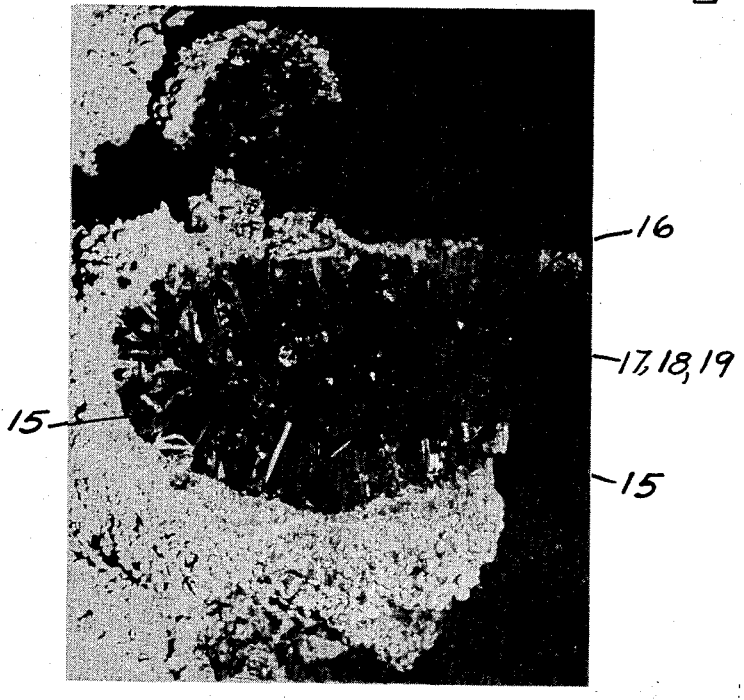

FIG. 7 is a photograph of the crystal zone formed as the result of the method practiced herein, showing the size of the crystal zone. This photograph corresponds in location to line 7—7 at the beginning end or thicker section of FIG. 3 and has a conventional sized cigarette laid on the crystals in the bottom section of the crystal zone; and FIG. 8 is a view of a column of MgO crystals formed by this process showing in a very exaggerated representation, the migration of residual impurities through the molten mass as it solidifies to the desired crystalline form.

For the purpose of producing a maximum crystal growth, according to this invention, a furnace is provided comprised of a broad shallow car 10 movable relative to a pair of electrodes 12, the latter being supported above the open top of the car for movement vertically downwardly into the bed of material carried in the car at one end thereof for beginning the operation. The car is preferably formed of sheet metal and may have the side walls thereof cooled by a water curtain sprayed onto the sides thereof. As taught herein, to form magnesium oxide crystals, the car is filled with granular crushed magnesite of the desired purity, the electrodes of conventional construction are lowered into engagement with a carbon bridge 13 layed initially on the surface of the material, and current is supplied while the car is held stationary to form an initial zone of molten magnesium oxide. Any known method for starting the melt may be subtsituted for the carbon bridge. Once this zone is established, the car is moved while heat is supplied by the current flow through the electrodes and fusing is continued. The car is moved forwardly slowly relative to the electrodes after the initial fused zone is established so as progressively to melt the bed of magnesite under the electrodes as the material is moved progressively thereunder, the rate of travel being dependent on the spacing of the electrodes, the size of the container and the power supply. Simultaneously the molten magnesia moving away from the area under the electrodes, begins to cool. As the molten magnesium oxide moves away from the electrodes it becomes quiescent, and cools slowly while maintained under conditions that are ideal for solidifying or crystallizing the magnesia in a manner to obtain maximum crystal growth.

Melting of the magnesite and subsequent crystal formation takes place when fusion and solidification are carried out in the manner just described, as shown in FIGS. 2 to 5 inclusive, over a relatively wide area which has its maximum depth at the start of the operation and which progressively becomes shallower due to progressively more rapid heat loss as the operation continues to its conclusion. Throughout the entire operation of the process, however, due to the proper selection of the size of car 10 and the depth of the bed of magnesite, the fused mass is contained in and shielded below and along its sides by portions of the unfused bed material. The fused magnesium oxide crystallizes out as the fused mass cools while it is supported in the bed material which forms a very effective insulating wall to slow down the cooling rate. Cubic crystals of MgO form in the zone 15 of FIGS. 3 and 8 by growing down from the surface of the melt toward the middle and at right angles from the side and bottom walls of "the crucible" formed of the unfused material toward the middle. The crystal zone is thickest at the starting end and thinnest at the terminal end due to the heat flow pattern inherent in the car here shown. The bulk of the single crystals recovered from this zone 15 measure between approximately ¼" x ¼" and 1" x 1" on a face. The thickness varies from ⅟₁₆ of an inch to 1 inch. Occasionally crystals of 2" x 2" x 2" have been produced. Polycrystalline plates have been produced which vary in size up to as large as 12" x 12" x 1". When polycrystalline plates are formed a very small but detectable portion of the impurities present in the feed material may tend to collect on the interface between the several crystals; however, where such conditions can be tolerated, polycrystalline plates of MgO crystals have been produced having their axes oriented in such a manner as to give the appearance and effect when polished, of a single crystal.

With a high purity magnesite feed having an analysis as set forth in the chart below, the various impurities in the feed material migrate during subsequent solidification to the several zones within the crystallized material 15 to 19, referring to FIG. 8, as indicated by a subsequent analysis.

|  | Feed | Zones | | | | |
|---|---|---|---|---|---|---|
|  |  | 15 | 16 | 17 | 18 | 19 |
| SiO₂ | 0.11 | 0.02 | 0.07 | 0.15 | 0.10 | 0.81 |
| Fe₂O₃ | 0.12 | 0.02 | 0.06 | 0.09 | 0.17 | 0.41 |
| TiO₂ | 0.01 | 0.01 | 0.02 | 0.02 | 0.02 |  |
| Al₂O₃ | 0.12 | 0.03 | 0.08 | 0.11 |  |  |
| CaO | 0.04 | ND | ND | 0.01 |  |  |
| ZrO₂ | 0.02 | ND | ND | 0.01 |  |  |
| MgO (by difference) | 99.52 | 99.92 | 99.77 | 99.61 |  |  |

Zone 15 constitutes the area where the most useful crystals are to be found. Zone 16 results primarily from the condensation of those portions of the impurities that are rendered volatile and are subsequently condensed on the top of the fusion zone as cooling proceeds. The zones 17, 18 and 19 are formed as solidification proceeds, the impurities moving toward the center of the mass in accordance with well known principles.

It should be understood that the impurities migrate in varying degrees through the crystal column and FIG. 8 is a distorted representation to emphasize the zone effect. The impurities do tend to land predominantly in the areas as depicted but the boundaries between zones are much more gradated. Using 100% magnesite feed materials of high purity, the composition of the clear crystals, regardless of the slight variations in impurities in the various batches of feeds, will show an analysis in zone 15 of Of between, percent
$SiO_2$ ---------------------------------- 0.01 to 0.03
$Fe_2O_3$ --------------------------------- 0.03 to 0.10
$Al_2O_3$ --------------------------------- 0.03 to 0.50
CaO ----------------------------------- Trace to 0.01

The type of crystal obtained by this process is in marked contrast to the type of crystal which is ordinarily produced in a vertical type arc furnace where the molten material is exposed to nearly constant agitation as it cools due to the fact that in this type of furnace new increments or batches of the material are constantly being added to the top of the melt as the electrodes are being withdrawn. Other detrimental features in this vertical furnace are (1) the geometry is such as to force any crystals that do start to form to limit themselves in size by growing into one another, (2) the rate and direction of heat loss from a vertical furnace are not inducive to large crystal growth, whereas in the present invention the large flat surfaces of the moving bed allow the heat to flow at the optimum rate and direction to create the largest number of large sized crystals from a molten bath. The cooling effect of the water curtain on the side of the car can also be varied to effect the optimum control of heat loss consistent with the best crystal growth.

The best results with the method described herein can, of course, be achieved with a high purity material, for example magnesite containing 99% magnesium oxide. However, some crystals can be obtained from magnesite of a very much lower purity. Due to the particular form of zone refining incident to this solidification operation as exemplified by zones 15 to 19 of FIG. 8, processing magnesite which is substantially 100% magnesium oxide results in crystals whose composition, as above noted, contain only trace amounts of impurities, the most undesirable being calcium oxide, silicon dioxide, and ferric oxide. Crystals as formed herein may be used as optical windows for the transmission of infra red rays and if desired, small percentages of a wide variety of elements or compounds such as $V_2O_5$, $Mo_2O_3$, NiO, CoO, CuO, $TiO_2$, $ZrO_2$, $Cr_2O_3$, $UO_2$, $MnO_2$, NaCl and C, may be introduced into the magnesium oxide crystals to condition them for special uses in such fields as masers, lassers and nuclear magnetic resonance studies.

Figure 6:
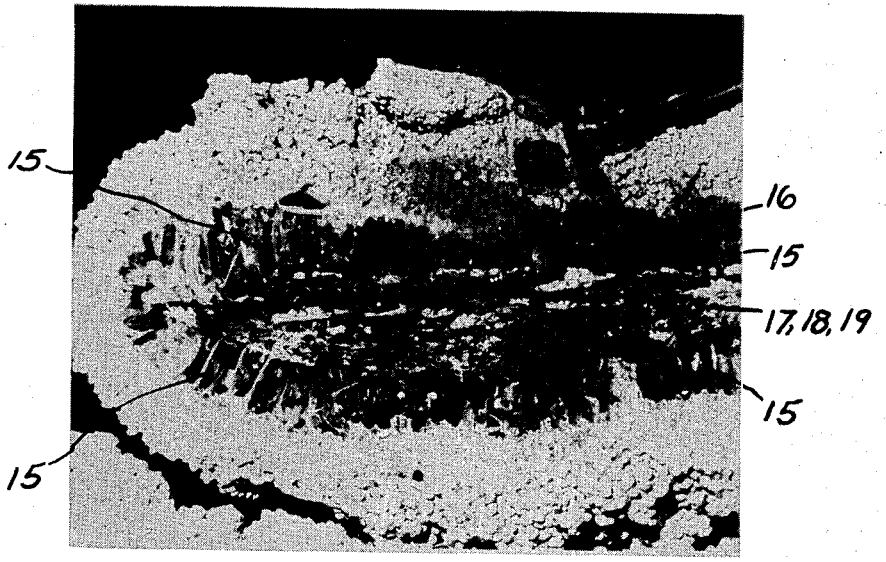
FIG. 6 is a photograph of the crystal zone formed as the result of the method practiced herein, showing the size of the crystal zone. This photograph corresponds in location to FIG. 4.

The rate of cooling may also be controlled as deemed best to minimize the internal stresses in the crystals resulting from cooling the mass. To assist in this control, a blanket of magnesite is gently deposited on top of the fused material as it leaves the zone defined by the electrodes. This layer may be seen in the view shown in FIG. 6, the top unfused layer there shown having been laid in place after the fusion was made.

By way of illustration but without limitation, the car 10, which may take the form of a metal box, is 5 feet wide, 9 feet long and 3 feet deep and holds approximately 18,000 pounds of magnesium oxide. In order to achieve the high temperature required to melt magnesium oxide, conventional electric arc heating electrodes are employed. After the initial molten bath is established, the car is drawn along with any suitable means preferably at a uniform rate of about 10 inches per hour past the pair of electrodes in a direction such that the bed of material in the car will move lengthwise at right angles to a line drawn between the centers of the electrodes. The electrodes are preferably formed of pure graphite to minimize contamination; are in the order of 10 inches in diameter; and are supported parallel to each other and perpendicular to the top of the car. A temperature in the order of 2800° C. or better is required to melt the MgO and can be obtained by the use of electric arc heating in contrast to induction heating. In order to withstand the high temperatures necessary for melting the magnesium oxide the metal car must be protected from the molten bath by an inner self-formed crucible of unfused MgO or an equivalent refractory material.

In order to initiate operation a coke or carbon bridge 13 is placed on top of the bed of crushed magnesium oxide mix about 18 inches from one end of the bed as shown in FIG. 1, whereupon the eletcrodes are lowered into engagement with the bridge and power is supplied in the order of 1200 kw. at approximately 140 volts. This load is kept more or less constant during the entire run by automatic electrode controls. The electrodes are maintained in the bed of material until the length of the car has been pulled past the electrode station and then the electrodes are withdrawn at about 18 inches from the opposite end of the bed to complete the operation. The fused magnesia in the furnace is left undisturbed to cool down under controlled conditions to a temperature at which the material can be handled whereupon the pig is removed from the car, carefully broken up, and rough-sorted for the crystals and crystal plates. Thereafter the selected crystals and plates are polished for use.

The geometry of the car may be varied so that the process may be carried out for a few pounds or many tons of material. An inner lining of insulation may be used in the car in addition to the excess bed material to lessen the heat loss and thereby to provide for closer control of the cooling.

The rate of travel of the car, the electrode spacing, the container size and power input will be determined by the purity of the material used, the capacity of the equipment and the electrode size. Either single or multi-stage power supply may be used. It is apparent also that the container may be held stationary and the electrodes may be mounted for both vertical and horizontal movement whereby to strike the arc for using the material in the bed and then moving the electrodes horizontally through the stationary bed.

The car itself may be provided with suitable jacketing for cooling in order to prevent damage.

Although the method has been described herein for the specific purpose of making magnesium oxide crystals it suggests itself for making crystals of other refractory crystallizable material that can be melted in an arc furnace such as urania and thoria and it has been found to be useful in making lime and zirconia crystals.

This process is to be distinguished from known and conventional zone refining techniques wherein horizontally movable pigs of relatively easily fusible material are swept lengthwise by one or more zones of molten material in an induction heating furnace. Such refining is performed for the purpose of purification rather than crystal formation and this type of purification could not be accomplished in the furnace here disclosed.

It should be understood that the present disclosure is for the purpose of illustration only and that this invention includes all modifications and equivalents which may fall within the scope of the appended claims.

We claim:

1. A method of producing large plate-like crystals in a horizontally elongated bed of granular crystallizable refractory material selected from the group consisting of magnesium oxide, zirconium oxide and lime comprising:
    (a) insulatingly supporting a horizontally elongated bed of said granular crystallizable refractory material at its bottom and sides with granular material which remains substantially unmelted throughout the process of producing said crystals, the upper surface of said elongated bed being exposed to electrodes which form an arc adjacent one end of said bed,
    (b) melting a portion of the bed of granular crystallizable refractory material by setting up a flow of current from one electrode to another thereby establishing a zone of liquid refractory material adjacent said one end of the elongated bed of crystallizable refractory material, and
    (c) providing relative horizontal movement between the electrodes and the bed thereby progressively shifting the liquid zone from said one end to the other end of said elongated bed by melting successive increments of the bed of crystallizable refractory material along the upper surface at the side of the liquid zone in front of the electrodes and simultaneously allowing successive increments of the liquid zone in back of the electrodes to solidify while in a substantially quiescent condition thereby moving said liquid zone through substantially the longitudinal extent of said bed of crystallizable refractory material.

2. The method of claim 1 wherein the electrodes are spaced apart transversely of the relative movement between the bed and the electrodes such that the liquid zone extends in a direction transverse to the direction of relative movement between said electrodes and said bed of crystallizable refractory material.

3. The method of claim 1 wherein said crystallizable refractory material is magnesium oxide.

4. The method of claim 3 wherein the granular material supportingly insulating the bed of magnesium oxide is magnesite.

5. The method of claim 1 wherein said bed of crystallizable refractory material is zirconium oxide.

6. The method of claim 1 wherein said bed of crystallizable refractory material is lime.

References Cited

UNITED STATES PATENTS

| | | | |
|---|---|---|---|
| 2,487,290 | 11/1949 | Austin | 23—304 |
| 2,883,721 | 4/1959 | Gorga | 22—57.2 |
| 3,154,381 | 10/1964 | Chell | 23—119 |
| 3,251,659 | 5/1966 | Mueller | 23—304 |

FOREIGN PATENTS

| | | |
|---|---|---|
| 481,869 | 6/1953 | Italy. |
| 241,644 | 8/1946 | Switzerland. |

NORMAN YUDKOFF, *Primary Examiner.*

S. E. EMERY, *Assistant Examiner.*